(12) United States Patent
Kamm et al.

(10) Patent No.: US 7,670,246 B2
(45) Date of Patent: Mar. 2, 2010

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 298 days.

(21) Appl. No.: 11/773,652

(22) Filed: Jul. 5, 2007

(65) Prior Publication Data
US 2008/0064556 A1   Mar. 13, 2008

(30) Foreign Application Priority Data
Jul. 6, 2006    (DE) ................ 10 2006 031 308

(51) Int. Cl.
*F16H 3/62* (2006.01)
(52) U.S. Cl. ................................ 475/275
(58) Field of Classification Search ......... 475/275–278, 475/284
See application file for complete search history.

(56) References Cited

U.S. PATENT DOCUMENTS

| | | | | |
|---|---|---|---|---|
| 4,070,927 A * | 1/1978 | Polak | ........................ | 475/286 |
| 4,683,776 A * | 8/1987 | Klemen | ........................ | 475/286 |
| 6,176,803 B1 * | 1/2001 | Meyer et al. | ................... | 475/286 |
| 6,634,980 B1 | 10/2003 | Ziemer | | |
| 6,960,149 B2 | 11/2005 | Ziemer | | |
| 7,014,589 B2 | 3/2006 | Stevenson | | |
| 7,018,319 B2 | 3/2006 | Ziemer | | |
| 7,226,381 B2 * | 6/2007 | Klemen | ........................ | 475/275 |
| 7,364,527 B2 * | 4/2008 | Klemen | ........................ | 475/290 |
| 2004/0048716 A1 * | 3/2004 | Ziemer | ........................ | 475/286 |
| 2009/0017966 A1 * | 1/2009 | Phillips et al. | ............... | 475/275 |

FOREIGN PATENT DOCUMENTS

| | | |
|---|---|---|
| DE | 42 34 572 A1 | 4/1994 |
| DE | 199 49 507 A1 | 4/2001 |
| DE | 100 83 202 T1 | 1/2002 |
| DE | 101 15 983 A1 | 10/2002 |
| DE | 101 15 995 A1 | 10/2002 |
| DE | 10 2004 029 952 A1 | 1/2005 |
| DE | 10 2005 002 337 A1 | 8/2006 |
| DE | 10 2005 032 001 A1 | 2/2007 |

* cited by examiner

*Primary Examiner*—Ha D. Ho
(74) *Attorney, Agent, or Firm*—Davis & Bujold, P.L.L.C.

(57) ABSTRACT

The 8-gear transmission comprising an input shaft (AN), an output shaft (AB), four planetary gearsets (RS1, RS2, RS3, RS4), eight rotary shafts (1, 2, 3, 4, 5, 6, 7, 8) and five shifting elements (A, B C, E, E). The first shifting element (A) is arranged within the power flow between the third shaft (3) and a housing (GG) of the transmission, the second shifting element(B) is arranged within the power flow between the fourth shaft (4) and the housing (GG), the third shifting element (C) is arranged within the power flow between the first and the fifth shafts (1, 5), the fourth shifting element (D) is arranged within the power flow between the fifth and the eighth shafts (5, 8), and the fifth shifting element (E) is arranged within the power flow between the fifth and the seventh shafts (5, 7).

33 Claims, 4 Drawing Sheets

| GEAR | ENGAGED SHIFTING ELEMENTS | | | | | RATIO i | STEP φ |
|---|---|---|---|---|---|---|---|
| | BRAKE | | CLUTCH | | | | |
| | A | B | C | D | E | | |
| 1 | ● | ● | ● | | | 4.70 | |
| 2 | ● | ● | | | ● | 3.13 | 1.50 |
| 3 | | ● | ● | | ● | 2.10 | 1.49 |
| 4 | | ● | | ● | ● | 1.67 | 1.26 |
| 5 | | ● | ● | ● | | 1.29 | 1.30 |
| 6 | | | ● | ● | ● | 1.00 | 1.29 |
| 7 | ● | | ● | ● | | 0.84 | 1.19 |
| 8 | ● | | | ● | ● | 0.67 | 1.26 |
| R | ● | ● | | ● | | -3.28 | TOTAL 7.05 |

Fig. 2

MULTI-SPEED TRANSMISSION

This application claims priority from German Application Serial No. 10 2006 031 308.9 filed Jul. 6, 2006.

FIELD OF THE INVENTION

The invention concerns a multi-speed transmission with planetary design, particularly an automatic transmission for a motor vehicle, comprising an input shaft, an output shaft, four planetary gearsets, at least eight rotary shafts, as well as five shifting elements, whose selective engagement produces different transmission ratios between input shaft and output shaft, so that eight forward gears and at least one reverse gear can be realized.

BACKGROUND OF THE INVENTION

Automatic transmissions, particularly for motor vehicles, in the state of the art, include planetary gearsets that are shifted by way of friction or shifting elements, such as clutches and brakes, and a starting element, such as a hydrodynamic torque converter or a fluid clutch, subjected to a slip effect and optionally provided with a lockup clutch.

Within the scope of DE 101 15 983 A1 of the Applicant, for example, is described a multi-speed transmission with an input shaft connected to a front-mounted gearset train to an output shaft connected to a rear-mounted gearset train, and with a maximum of seven shifting elements, by way of whose optional shifting at least seven forward gears can be shifted into without range shifts. The front-mounted gearset train is composed of a shiftable or non-shiftable planetary gearset, or of a maximum of two non-shiftable planetary gearsets that are coupled to each other. The rear-mounted gear train is configured as a two-carrier, four-shaft transmission with two shiftable, planetary gearsets and features four free shafts. The first free shaft of this two-carrier, four-shaft transmission is connected to the first shifting element; the second free shaft to the second and third shifting element; the third free shaft to the fourth and fifth shifting element, and the fourth free shaft is connected to the output shaft. For a multi-speed transmission with a total of six shifting elements, it is proposed according to the invention to connect the third free shaft or the first free shaft of the rear-mounted gear train additionally to a sixth shifting element. For a multi-speed transmission with a total of seven shifting elements, it is proposed according to the invention to connect the third free shaft additionally to a sixth shifting element, and the first free shaft additionally to a seventh shifting element.

Several other multi-speed transmissions are also known from DE 101 15 995 A1 of the applicant, for example, which are provided with four shiftable planetary gearsets that are coupled to each other and six or seven friction-based, shifting elements, by way of whose selective engagement a rotational speed of an input shaft of the transmission can be transferred in such a way to an output shaft of the transmission that nine or eleven forward gears and at least one reverse gear can be engaged. Depending on the gearbox set-up, two or three shifting elements are engaged in each gear, whereby when shifting from one gear into the next higher or next lower gear, only one engaged shifting element is disengaged in order to avoid range shifts and one shifting element that was not previously engaged is connected.

In addition, the unpublished patent application DE 10 2005 002 337.1 of the applicant proposes a multi-speed transmission with an input shaft, an output shaft, four individual planetary gearsets that are coupled to each other, and five shifting elements, with which eight forward gears can be shifted into without range shifts, that is, in such a way, that when shifting from a forward gear into the next higher or lower forward gear, only one of the previously engaged shifting elements is disengaged and only one of the previously disengaged shifting elements is engaged. This multi-speed transmission also features one reverse gear. In all forward gears and in the reverse gear, three shifting elements are engaged at any one time. With regard to the kinematic coupling of the four planetary gearsets with respect to each other and to the input and output shafts, it is provided that a carrier of the fourth planetary gearset and the input shaft are connected to each other and form a first shaft of the transmission; a carrier of the third planetary gearset and the output shaft are connected to each other and form a second shaft of the transmission; a sun gear of the first planetary gearset and a sun gear of the fourth planetary gearset are connected to each other and form a third shaft of the transmission; a ring gear of the first planetary gearset forms a fourth shaft of the transmission; a ring gear of the second planetary gearset and a sun gear of the third planetary gearset are connected to each other and form the fifth shaft of the transmission; a carrier of the first planetary gearset and a ring gear of the third planetary gearset are connected to each other and form a sixth shaft of the transmission; a sun gear of the second planetary gearset and a ring gear of the fourth planetary gearset are connected to each other and form a seventh shaft of the transmission; and a carrier of the second planetary gearset forms an eighth shaft of the transmission. Regarding the kinematic coupling of the five shifting elements to the four planetary gearsets and to the input and output shafts, it is provided that the first shifting element is arranged in the power flow between the third shaft and a housing of the transmission, the second shifting element between the fourth shaft and the housing of the transmission, the third shifting element between the first and fifth shafts, the fourth shifting element either between the eighth and second shaft or between the eighth and sixth shaft, as well as the fifth shifting element either between the seventh and fifth shaft or between the seventh and eighth, or between the fifth and eighth shaft.

Automatically shiftable motor vehicle transmissions in planetary design have in general already been described many times in the state of the art and are subjected to constant further development and improvement. These transmissions should therefore feature a sufficient number of forward gears, as well as one reverse gear, and transmission ratios that are very well suited for motor vehicles, with a high total transmission ratio spread, and with favorable progressive ratios. In addition, they should enable a high startup gear ratio in forward direction and contain a direct gear for use in both passenger cars and commercial vehicles. In addition, these transmissions should not have a complicated construction and require in particular a small number of shifting elements and avoid double shifting with a sequential shifting method, so that only one shifting element is changed at one time when shifting within defined gear ranges.

It is an object of the invention to propose a multi-speed transmission of the type named above with at least eight range shift-free shiftable forward gears and at least one reverse gear, in which the lowest possible number of shifting elements is required with the use of a total of four planetary gearsets. In addition, the transmission should feature a large ratio spread with comparatively harmonic gear stepping, and at least in the main driving gears, a favorable degree of efficiency, that is, comparatively little drag and gearing loss.

SUMMARY OF THE INVENTION

The multi-speed planetary transmission according to the invention is based on the gearbox diagram of the patent application DE 102005002337.1 of the above kind of the applicant and features an input shaft, an output shaft, four planetary gearsets that are coupled to each other, at least eight rotary shafts, as well as five shifting elements (two brakes and three clutches), whose selective engagement produces different transmission ratios between the input shaft and the output shaft, so that eight forward gears an one reverse gear are realizable. In each gear, three of the of the five shifting elements are respectively engaged, whereby when there is a change from a forward gear into the next higher or lower forward gear, only one of the previously engaged shifting elements is disengaged at any time, and only one of the previously disengaged shifting elements is engaged.

According to the invention, it is proposed that:
a carrier of the fourth planetary gearset and the input shaft are permanently connected to each other and form the first shaft of the transmission;
a ring gear of the second planetary gearset and a carrier of the third planetary gearset and the output shaft are permanently connected to each other and form the second shaft of the transmission;
a sun gear of the first planetary gearset and a sun gear of the fourth planetary gearset are permanently connected to each other and form the third shaft of the transmission;
a ring gear of the first planetary gearset forms the fourth shaft of the transmission;
a sun gear of the third planetary gearset forms the fifth shaft of the transmission;
a carrier of the first planetary gearset and a ring gear of the third planetary gearset are permanently connected to each other and form the sixth shaft of the transmission;
a sun gear of the second planetary gearset and a ring gear of the fourth planetary gearset are permanently connected and form the seventh shaft of the transmission;
a carrier of the second planetary gear forms the eighth shaft of the transmission;
a the first shifting element is arranged within the power flow between the third shaft and a housing of the transmission;
a the second shifting element is arranged within the power flow between the fourth shaft and the housing of the transmission;
a the third shifting element is arranged within the power flow between the first and fifth shaft of the transmission;
the fourth shifting element is arranged within the power flow between the fifth and eighth shaft of the transmission, and
the fifth shifting element is arranged within the power flow between the fifth and seventh shaft of the transmission.

The multi-speed transmission in planetary design according to the invention differs from the multi-speed transmission of the generic kind according to DE 10 2005 002 337.1 in that the ring gear of the second planetary gearset and the carrier of the third planetary gearset and the output shaft are now permanently connected to each other as the second shaft of the transmission, and the fifth shaft of the transmission is now formed by the sun gear of the third planetary gearset.

As in the generic multi-speed transmission according to DE 10 2005 002 337.1, it is also applicable for the multi-speed transmission that the first forward gear is produced by engaging the first, second and third shifting elements; the second forward gear by engaging the first, second and fifth shifting elements; the third forward gear by engaging the second, third and fifth shifting elements; the fourth forward gear by engaging the second, fourth and fifth shifting elements; the fifth forward gear by engaging the second, third and fourth shifting elements; the sixth forward gear by engaging the third, fourth and fifth shifting elements; the seventh forward gear by engaging the first, third and fourth shifting elements; the eighth forward gear by engaging the first, fourth and fifth shifting elements; and the reverse gear by engaging the first, second and fourth shifting elements.

Three of the four planetary gearsets are configured as so-called negative planetary gearsets, whose respective planetary gears mesh with the sun gear and ring gear of the respective planetary gearset. One of the four planetary gearsets—specifically, the second planetary gearset—is configured as a so-called positive planetary gearset with meshing inner and outer planetary gears, whereby these inner planetary gears also mesh with the sun gear of this positive planetary gearset, and whereby these outer planetary gears also mesh with the ring gear of this plus planetary gearset. Regarding the spatial arrangement of the four planetary gearsets in the housing of the transmission, an advantageous configuration proposes that the four planetary gearsets be arranged in a sequence of "first, fourth, second, third planetary gearset".

The spatial arrangement of the shifting elements of the multi-step transmission, according to the invention, inside their transmission housing is, in principle, limited only by the measurements and the external shape of the transmission housing. Numerous suggestions regarding the spatial arrangement and constructive embodiment of the shifting elements can be seen, for example, in the patent application of the above kind DE 10 2005 002 337.1.

For example, in a variation of the shifting element embodiment that is favorable for a standard transmission, it can be provided that the first and second shifting elements are arranged from a spatial point of view at least partially within an area located radially above the first and or fourth planetary gearset, and that the third and fifth shifting element can be arranged from a spatial point of view at least partially within an area located axially between the fourth and second planetary gearset, and that the fourth shifting element is arranged at least in part within an area located axially between the second and third planetary gearset. In a favorable constructive embodiment, a common disc support can be provided for the third and fifth shifting elements. From the spatial point of view, the third and fifth shifting element can be arranged at least partially axially side-by-side, or at least partially radially one above the other. From the spatial point of view, the first and second shifting elements can be arranged at least partially axially side-by-side, or at least partially radially one above the other.

The embodiment of the multi-speed transmission, according to the invention, produces transmission ratios that are particularly suitable for passenger cars, with a large total transmission ratio spread in harmonic gear stepping. In addition, with the multi-speed transmission according to the invention, the construction material requirements are comparatively small due to the small number of shifting elements, that is, two brakes and two clutches. In addition, the multi-speed transmission also displays good efficiency in all gears, on the one hand, due to the low drag loss, because only two shifting elements are not engaged in each gear and, on the other hand, as a result of the low gearing losses in the simply constructed individual planetary gearsets.

In addition, it is advantageously possible with the multi-speed transmission according to the invention to start the vehicle using a hydrodynamic converter, an external starting clutch or also with other suitable external starting elements. It is also conceivable to enable a starting process with a starting element that is integrated into the transmission. Advantageously suitable for this process is one of the two brakes, which is activated in the first and second forward gear and in the reverse gear.

In addition, the inventive multi-speed transmission is designed in such a way that an adaptability to different power train arrangements is possible in both power flow directions and from a spatial point of view. It is possible, for example, without special constructive measures, to arrange the transmission input and output alternately co-axially or axially parallel with respect to each other.

For example, for use with input and output shafts that run co-axially with respect to each other, it is practical that the first planetary gearset is the planetary gearset that faces the engine of the transmission of the inventive planetary gearset group. Depending on the spatial arrangement of the five shifting elements inside the transmission housing, it can be provided that in each case, no more than one shaft of the transmission passes in an axial direction through the center the four planetary gearsets. In that way, in connection with a shifting element arrangement in which the four planetary gearsets are arranged co-axially with respect to each other, side by side, in the sequential order of "first, fourth, second, third planetary gearset," it can be provided that the first and second shifting elements are arranged near the engine in the area radially above the first or fourth planetary gearset, where the third and fifth shifting elements are arranged at least partially within an area located axially between the fourth and second planetary gearset, and where the fourth shifting element is arranged at least partially in an area located axially between the second and third planetary gear, only the first shaft of the transmission passing in an axial direction through the center of the first and fourth planetary gearsets, while only the fifth shaft of the transmission passes in an axial direction through the center of the second planetary gearset, and no shaft of the transmission has to pass in an axial direction through the center of the third planetary gearset. The constructive design of the pressurizing medium and lubricant supply to the servo units of the individual shifting elements is correspondingly simple.

For use with axially parallel or input and output shafts that run at an angle with respect to each other, the first or the third planetary gearset can be arranged on the side of the transmission housing that faces the drive motor that is functionally connected to the drive shaft. If the first planetary gearset faces the transmission drive, it can be provided—as with the co-axial arrangement of input and output shafts—depending on the spatial arrangement of the five shifting elements inside the transmission housing—that no more than one shaft of the transmission passes in an axial direction through each of the four planetary gearsets: only the first shaft of the transmission passing through the first and fourth planetary gearset, only the fifth shaft of the transmission through the second planetary gearset.

On the other hand, if the third planetary gearset faces the input of the transmission, when the input and output are not arranged co-axially with respect to each other, no shaft of the transmission has to pass in an axial direction through the first and fourth planetary gearsets. In connection with the arrangement cited above, wherein the third and fifth shifting elements are arranged axially between the second and fourth planetary gearset, and the fourth shifting element is arranged axially between the second the third planetary gearset, for example, both the fifth shaft of the transmission and the first shaft of the transmission pass in an axial direction through the center of the second planetary gearset, the first shaft of the transmission runs then by sections centrally within this fifth shaft, while only the first shaft passes centrally in an axial direction through the third planetary gearset.

In any case, the third shaft of the transmission, which is formed in sections by the sun gears of the first and fourth planetary gearsets, can be rotatably mounted on a hub that is affixed to the housing. If the first planetary gearset faces the drive of the transmission, the cited hub, which is affixed to the housing, is an element of the housing wall at the input side. Otherwise, it is an element of the housing wall opposite the propulsion engine.

The invention will now be described, by way of example, with reference to the accompanying drawings. The same or comparable components are provided with the same reference numerals. In the drawings:

FIG. 2 shows an example of a shift pattern for the multi-speed transmission according to FIG. 1;

DETAILED DESCRIPTION OF THE INVENTION

Figure 1:
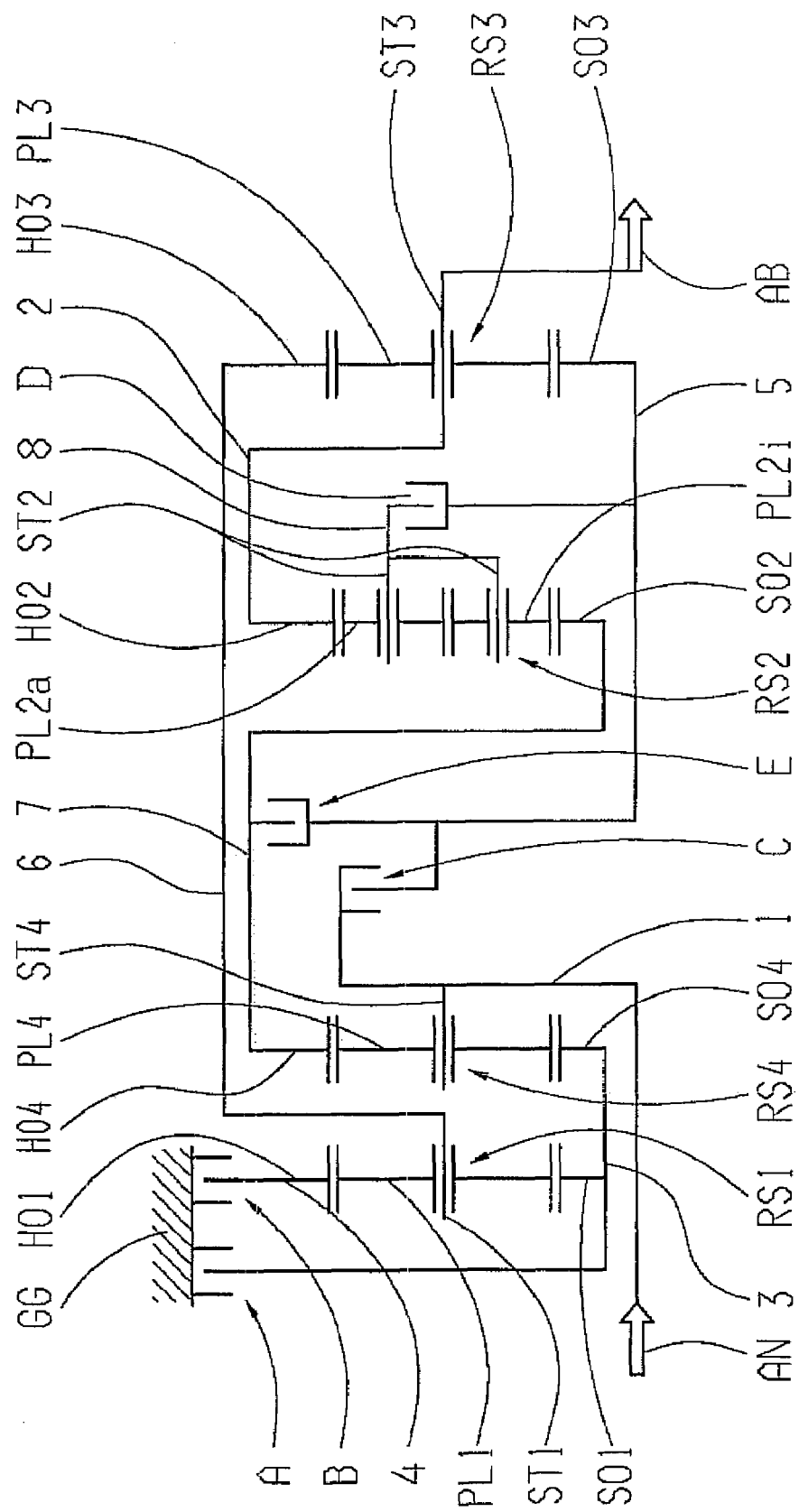
FIG. 1 shows a schematic representation of an example of an embodiment of a multi-speed transmission according to the invention.

FIG. 1 shows an exemplary embodiment of a multi-speed transmission, according to the invention, in schematic representation. The transmission comprises an input shaft AN and an output shaft AB, as well as four planetary gearsets RS1, RS2, RS3, RS4, and five shifting elements A, B, C, D, E, which are all arranged in a housing GG. In this exemplary embodiment, the four planetary gearsets RS1, RS2, RS3, RS4 are arranged co-axially, one after the other, in an axial direction in the sequential order of "RS1, RS4, RS2, RS3". The planetary gearsets RS1, RS3, and RS4 are configured as simple negative planetary gearsets. As is generally known, a negative planetary gearset features planetary gears that engage a sun and ring gears of this planetary set. The ring gears of the planetary gearsets RS1, RS3, RS4, are identified with HO1, HO3, and HO4; the sun gears are identified with SO1, SO3, and SO4; the planetary gears are identified with PL1, PL3, and PL4, and the carriers, on which the planetary gears are rotatably mounted, are identified with ST1, ST3, and ST4. The planetary gearset RS2 is configured as a simple positive planetary gearset in double planetary construction. As is generally known, a positive planetary gearset features inner and outer planetary gears that mesh with each other, where the inner planetary gears also mesh with the sun gear of this planetary gearset and where the outer planetary gears also engage with the ring gear of this planetary gearset. A ring gear of the planetary gearset RS2 is identified with HO2; a sun gear is identified with SO2; an inner planetary gear is identified with PL2$i$; an outer planetary gear is identified with PL2$a$, and the carriers, on which the inner and outer planetary gears PL2$i$, PL2$a$ are rotatably mounted, are identified with ST2. The shifting elements A and B are configured as brakes which, in the exemplary embodiment presented herein, are both configured as frictionally shiftable disc brakes, which can of course be configured as frictionally shiftable band brakes in another embodiment and also as frictionally shiftable claw brakes or conical brakes. The shifting elements C, D, and E are configured as clutches which, in the exemplary embodiment shown, are all configured as frictionally shiftable disc clutches, and can naturally be configured as frictionally shiftable claw or conical clutches in another embodiment. With these five shifting elements A to E a selective shifting of eight forward gears and at least one reverse gear can be realized. The multi-speed transmission, according to the invention, therefore, features at least eight rotary shafts identified with reference numerals 1 to 8.

With regard to the kinematic coupling of the individual elements of the four planetary gearsets RS1, RS2, RS3, RS4, to each other and to the input and output shafts AN, AB, the following is provided: the carrier ST4 of the fourth planetary gearset RS4 and the input shaft AN are permanently connected and form the shaft 1. The ring gear HO2 of the second planetary gearset RS2 and the carrier ST3 of the third planetary gearset RS3 and the input shaft AB are permanently connected to each other and form the shaft 2. The sun gear SO1 of the first planetary gearset RS1 and the sun gear SO4 of the fourth planetary gearset RS4 are permanently connected and form the shaft 3. The ring gear HO1 of the first planetary gearset RS1 forms the shaft 4. The sun gear SO3 of the third planetary gearset RS3 forms the shaft 5. The carrier ST1 of the first planetary gearset RS1 and the ring gear HO3 of the third planetary gearset RS3 are permanently connected and form the shaft 6. The ring gear HO4 of the fourth planetary gearset RS4 and the sun gear of the second planetary gearset RS2 are permanently connected and form the shaft 7. The coupled carrier ST2 of the second planetary gearset RS2 forms the shaft 8.

With regard to the kinematic coupling of the five shifting elements A to E to the described shafts 1 to 8 of the transmission, the multi-speed transmission, according to FIG. 1, provides the following. Brake A as a first shifting element is arranged within the power flow between the shaft 3 and a housing GG of the transmission; brake B as a second shifting element is arranged within the power flow between shaft 4 and the housing GG; clutch C as a third shifting element is arranged within the power flow between the shaft 1 and the shaft 5; clutch D as a fourth shifting element is arranged between the shaft 5 and the shaft 8, and clutch E as a fifth shifting element is arranged within the power flow between the shaft 5 and the shaft 7.

Figure 11:
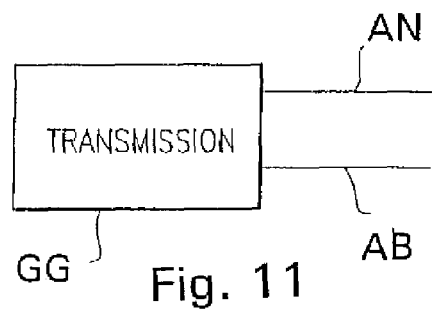
FIG. 11 is a diagrammatic view of the invention with the input and the output being provided on the same side of the multi-speed transmission housing.

In the exemplary embodiment shown in FIG. 1, the first planetary gearset RS1 is the gearset of the transmission nearest to the drive, and the third planetary gearset RS3 is the gearset nearest to the output of the transmission, where the input shaft AN and the output shaft AB are arranged co-axially with respect to each other. It is obvious to the person skilled in the art that this transmission can be modified without great effort so that the input and output shafts are no longer arranged co-axially with respect to each other, but as shown in FIG. 11, axially parallel or at an angle with respect to each other. With an arrangement of this type, the person skilled in the art will, if needed, arrange the drive of the transmission close to the third planetary gearset RS3, i.e., on the side of the third planetary gearset RS3 that faces away from the planetary gearset RS1.

In principle, the spatial arrangement of the shifting elements within the transmission is optional in the exemplary embodiment of a multi-speed transmission, according to the invention shown in FIG. 1, and is limited only by the measurements and the external shape of the transmission housing.

In the exemplary embodiment, shown in FIG. 1, the two brakes A, B are arranged from the spatial point of view in the area of the first planetary gearset RS1, which is near the drive input in this case, and axially side by side, where the kinematic connection of the two brakes A, B to the first planetary gearset RS1 requires that brake B is nearer to the fourth planetary gearset RS4, which is adjacent to the first planetary gearset RS1, than to brake A or, as the case may be, that brake A is arranged nearer to the drive input of the transmission than brake B. From the spatial point of view, brake B is at least partially arranged within an area located radially above the first planetary gearset RS1, and brake A is correspondingly arranged on the side (near the drive input) of the fourth planetary gearset RS4 facing away from the first planetary gearset RS1. An internal disc carrier of brake A forms a section of shaft 3 of the transmission and is connected in a rotationally fixed manner to the sun gear SO1 of the first planetary gearset RS1 on the side of the first planetary gearset RS1 that faces away from the fourth planetary gearset RS4. Shaft 3 is configured by sections as a kind of sun shaft that connects the sun gears SO1, SO4 of the planetary gearsets RS1, RS4 to each other. Shaft 3 can thereby be rotatably mounted either on the input shaft AN or a hub (not shown in more detail in FIG. 1) that is attached to the transmission housing. An interior disc carrier of brake B forms a section of shaft 4 of the transmission and is connected in a rotationally fixed manner to the ring gear HO1 of the first planetary gearset RS1. The external disc carriers of brakes A and B can each be integrated into the housing GG or also configured as separate components which are then attached in a rotationally fixed manner to the housing GG. The servo units that are necessary for activating the friction elements of the two brakes A, B are not presented in detail in FIG. 1 for the sake of simplicity and can be mounted in the transmission housing GG or a housing cover that is affixed on the transmission housing.

The person skilled in the art will modify this example of spatial arrangement of the two brakes A, B as needed, without particular inventive effort. Brake A can be arranged at least, in part, radially above the first planetary gearset RS1 and brake B can be arranged at least, in part, radially above the fourth planetary gearset RS4. In yet another embodiment, the two brakes A, B can be arranged on the side of the first planetary gearset RS1 that faces away from the fourth planetary gearset RS4, radially one above the other and axially adjacent to the first planetary gearset RS1, where brake B is then arranged on a larger diameter than brake A.

As can also be seen in FIG. 1, at least the disc sets of the clutches C and E are arranged from the spatial point of view, between the fourth and second planetary gearsets RS4, RS2, while at least the disc set of the clutch D is arranged from the spatial point of view in an area located axially between the second and third planetary gearsets RS2, RS3. The servo units of the three clutches: C, D, E that are required to activate these disc sets are not shown in detail in FIG. 1 for the purpose of simplification.

The clutch C is therein adjacent to the fourth planetary gearset RS4. An external disc carrier of the clutch C is connected in a rotationally fixed manner to the carrier ST4 of the fourth planetary gearset RS4 on the side of the disc set of the clutch C facing the fourth planetary gearset RS4, and with the input shaft AN and can, therefore, be identified as a section of shaft 1 of the transmission. An internal disc carrier of the clutch C is connected in a rotationally fixed manner to the sun gear SO3 of the third planetary gearset RS3 and can, therefore, also be identified as a section of shaft 5 of the transmission. The servo unit required for activating the disc set of the clutch C can be arranged inside the cylindrical chamber that is formed by the external disc set of the clutch C, can be mounted in an axially displaceable manner on this external disc carrier of the clutch C and constantly rotate at the rotational speed of shaft 1 or may be the input shaft. In order to compensate for the rotational pressure of the rotating pressure chamber of this servo unit, the clutch C can have a known dynamic pressure compensation.

As is also seen in FIG. 1, the disc set of the clutch E is adjacent, from the spatial point of view, to the second planetary gearset RS2 and therein in an area located axially between the disc set of the clutch C and the second planetary gearset RS2. The disc set of the clutch E can of course, be arranged from the spatial point of view radially above the disc set of the clutch C. An internal disc carrier of the clutch E is—like the internal disc carrier of the clutch C—connected in a rotationally fixed manner to the sun gear SO3 of the third planetary gearset RS3 and can, therefore, also be identified as a section of shaft 5 of the transmission. In that way, a common disc carrier can be provided for the clutches C and E, in a way that is advantageous for the production. An external disc carrier of the clutch E is attached in a rotationally fixed manner to the sun gear HO4 of the fourth planetary gearset RS4 and the sun gear SO2 of the second planetary gearset RS2 and, therefore, forms a section of shaft 7 of the transmission. The servo unit that is necessary for the activation of the disc set of the clutch E can be mounted in an axially displaceable manner on the internal disc carrier of the clutch E and can constantly rotate at the rotational speed of shaft 5, but can, however, be mounted in an axially displaceable manner on the external disc carrier of the clutch E and then constantly rotate at the rotational speed of shaft 7. The servo unit of the clutch E can, of course, have a dynamic pressure compensation.

As a deviation from the exemplary embodiment shown in FIG. 1, it can be provided, for example, in another embodiment of the transmission, that the two clutches C and E form a module that can be preassembled, which comprises disc sets for the clutches C and E arranged radially, one above the other, a common disc carrier, as well as the servo units intended for activation of the respective disc sets of the clutches C and E, wherein the disc set of the clutch C is arranged radially below the disc set of the clutch E, wherein the common disc carrier for the (radially inner) clutch C is configured as external disc carrier, and for the (radially outer) clutch E as an internal disc carrier and which, as a section of shaft 5 of the transmission, is permanently connected to the sun gear SO3 of the third planetary gearset RS3, and wherein both of the cited servo units are mounted in an axially displaceable manner on the common disc carrier.

As can also be seen in FIG. 1, the clutch D is axially adjacent to the second planetary gearset RS2 (on the side facing the third planetary gearset RS3). An external disc carrier of the clutch D is connected in a rotationally fixed manner to the carrier ST2 of the second planetary gearset RS2 and can, therefore, be identified as a section of shaft 8 of the transmission. An internal disc carrier of the clutch D is connected in a rotationally fixed manner to the carrier ST2 of the second planetary gearset RS2 and can, therefore, be identified as a section of shaft 8 of the transmission. An internal disc carrier of the clutch D is connected in a rotationally fixed manner to the sun gear SO3 of the third planetary gearset RS3 and in that way forms an additional section of shaft 5 of the transmission. The servo unit necessary for the activation of the disc set of the clutch D can be arranged inside the cylindrical chamber formed by the external disc carrier of the clutch D and be mounted in an axially displaceable manner on this external disc carrier of the clutch D and can then constantly rotate at the rotational speed of shaft 8. However, it can also be provided that the servo unit of the clutch D is mounted in an axially displaceable manner on the internal disc carrier of the clutch D and then constantly rotates at the rotational speed of the shaft 5. In order to compensate for the rotational pressure of the rotating pressurized chamber of this servo unit, the clutch D can have a known dynamic pressure compensation.

According to the gearset diagram corresponding to the sequential order of "RS1-RS4-RS2-RS3" of the four planetary gearsets RS1, RS2, RS3, RS4 and corresponding to the arrangement of the three clutches C, D, E within an area located axially between the fourth and third planetary gearset RS4, RS3, the length of shaft 6 of the transmission completely overlaps the fourth planetary gearset RS4, the two clutches C and E, the second planetary gearset RS2, as well as the clutch D in an axial direction. Shaft 6 therein radially overlaps shaft 7 and a section of shaft 2.

It is expressly pointed out that the arrangement of the five shifting elements A, B, C, D, E described above is to be considered as an example only. If needed, the person skilled in the art will modify this example of spatial arrangement of the five shifting elements A, B, C, D, E. Numerous proposals for this can be found in the patent application DE 10 2005 002 337.1 of the kind described above.

FIG. 2 presents a shift pattern for the multi-speed transmission shown in FIG. 1. In each gear, three shifting elements are engaged and two shifting elements are disengaged. Aside from the gear logic, examples of values for the respective transmission ratios in individual gear ratios i can be obtained, along with the ratio step progression φ determined from them. The specified ratios i are obtained from the (typical) stationary transmission ratios of the four planetary gearsets RS1, RS2, RS3, RS4 of negative 2.00, positive 2.60, negative 3.70, and negative 2.00. In addition, it can be seen from the shift pattern that double shifts or range shifts can be prevented with sequential shifting, because two adjacent gears in the shifting logic use two shifting elements in common. The sixth gear is configured as a direct gear.

The first forward gear ratio is realized by engaging the brakes A and B and the clutch C; the second forward gear ratio is realized by engaging the brakes A and B and the clutch E; the third forward gear ratio is realized by engaging the brake B and the clutches C and E; the fourth forward gear ratio is realized by engaging the brake B and the clutches D and E; the fifth forward gear ratio is realized by engaging the brake B and the clutches C and D; the sixth forward gear ratio is realized by engaging the clutches C, D, and E; the seventh forward gear ratio is realized by engaging the brake A and the clutches C and D, as well as the eighth forward gear ratio is realized by engaging the brake A and the clutches D and E. As can also be seen from the shift pattern, the reverse gear ratio is obtained by engaging the brakes A and B and the clutch D.

According to the invention, it is possible to start the motor vehicle with a shifting element integrated into the transmission. For this purpose is particularly suitable a shifting element that is used in both the first forward gear ratio and in the reverse gear ratio, in this case, preferably the brake A or the brake B. Advantageously, both of these brakes, A, B are also required in the second forward gear ratio. If the brake B is used as the starting element integrated into the transmission, initiating drive in the first five forward gear ratios and the reverse gear ratio is possible. As seen from the shift pattern, the clutch C can also be used when initiating drive in a forward direction, and clutch D can be used as an internal transmission starting element for initiating drive in a reverse direction.

The following applies to the illustrated or described exemplary embodiment for an inventive multi-speed transmission.

According to the invention, different gear spreads can be produced, even with the same gear gearbox diagram, depending on the stationary gearing ratios, which makes it possible to have gear spreads specific to the use or the vehicle.

Figure 8:
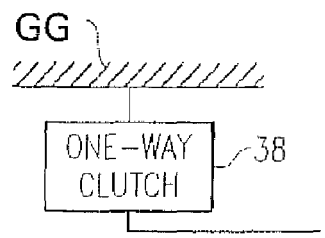
FIG. 8 is a diagrammatic view of a multi-speed transmission having a one-way clutch.

As shown in FIG. 8, it is also possible to provide additional one-way clutches at any suitable position in the multi-speed transmission between a shaft and the housing or in order to connect two shafts, if necessary.

Figure 3:
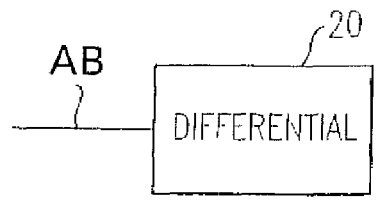
FIG. 3 is a diagrammatic view of a multi-speed transmission with a differential.

An axle differential and/or a distributor differential 20 can be arranged on either the input side or the output side, as shown in FIG. 3.

Figure 4:
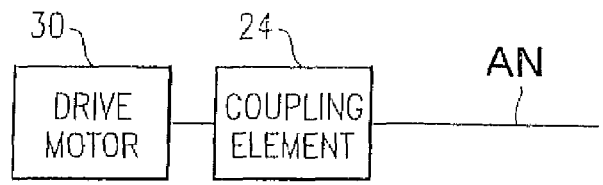
FIG. 4 is a diagrammatic view of a multi-speed transmission with a coupling element and a drive motor.
Figure 5:
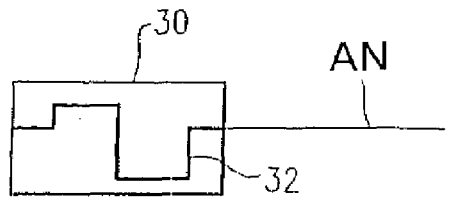
FIG. 5 is a diagrammatic view of a multi-speed transmission with a crankshaft of the drive motor fixed to an input shaft of the multi-speed transmission.
Figure 12:
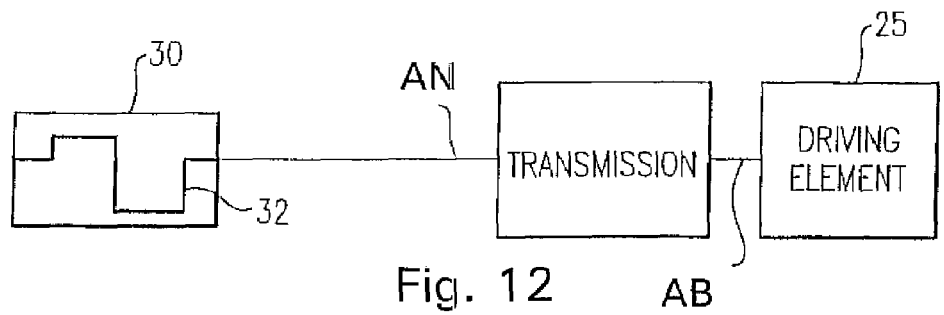
FIG. 12 is a diagrammatic view of a multi-speed transmission with the crankshaft of the drive motor fixed to the input shaft of the multi-speed transmission and the coupling element located behind the multi-speed transmission.

In an advantageous further development, shown in FIG. 4, the input shaft AN can be separated, if needed, from a coupling element 24 of a drive motor 30, where a hydrodynamic converter, a hydraulic clutch, a dry starting clutch, a wet starting clutch, a magnetic particle clutch, or a centrifugal clutch can be used as such a coupling element 24. It is also possible to arrange a driving element 25 of this kind within the power flow behind the transmission, as shown in FIG. 12 where, in this case, the input shaft AN is permanently connected to the crankshaft 32 of the drive motor 30, as shown in FIG. 5.

Figure 6:
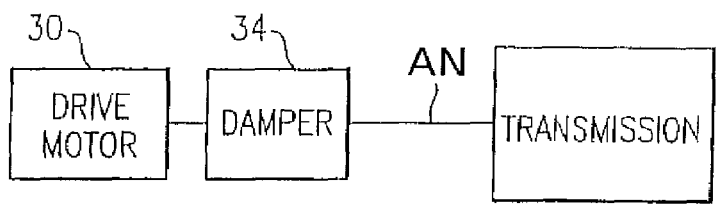
FIG. 6 is a diagrammatic view of a multi-speed transmission having the drive motor communicating with a damper.

In addition, the multi-speed transmission according to the invention, as shown in FIG. 6, provides the possibility of arranging a torsional vibration damper 34 between the drive motor 30 and the transmission.

Figure 7:
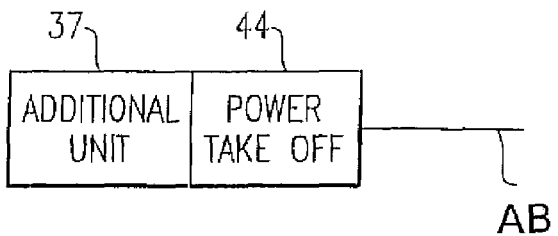
FIG. 7 is a diagrammatic view of a multi-speed transmission with a power take-off for driving an additional unit.
Figure 10:
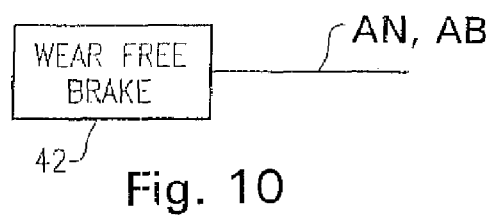
FIG. 10 is a diagrammatic view of a multi-speed transmission having a wear free brake.

Within the scope of an additional embodiment of the invention, as shown in FIG. 10, a wear-free brake 42, such as a hydraulic or electric retarder or the like can be arranged on the input shaft AN or the output shaft AB, which is particularly important for use in commercial vehicles. In addition, a power take-off 44 can be provided on each shaft, as shown in FIG. 7, preferably on the input shaft AN or the output shaft Ab, in order to drive additional units 37 on each shaft.

The shifting elements used can be configured as power-shifting clutches or brakes. In particular, frictional clutches or brakes, such as disc clutches, band brakes and/or conical clutches, can be used. In addition, friction-based brakes and or/clutches, such as synchronizations or claw clutches, can be used as shifting elements.

Figure 9:
FIG. 9 is a diagrammatic view of a multi-speed transmission with an electric machine.

A further advantage of the multi-speed transmission, described herein and shown in FIG. 9, is that an electric machine 40 can also be affixed to each shaft as a generator and/or an additional drive unit.

Any constructive design, in particular every spatial arrangement of the planetary sets and the shifting elements per se, as well as with respect to each other, and insofar as technically practical, can be included under the scope of the protection of the claims, without influencing the function of the transmission as specified in the claims, even if these designs are not explicitly presented in the Figures or in the specification.

REFERENCE NUMERALS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gearset
HO1 ring gear of the first planetary gearset
SO1 sun gear of the first planetary gearset
ST1 carrier of the first planetary gearset
PL1 planetary gears of the first planetary gearset
RS2 second planetary gearset
HO2 ring gear of the second planetary gearset
SO2 sun gear of the second planetary gearset
ST2 carrier of the second planetary gearset
PL2a outer planetary gears of the second planetary gearset
PL2i inner planetary gears of the second planetary gearset
RS3 third planetary gearset
HO3 ring gear of the third planetary gearset
SO3 sun gear of the third planetary gearset
ST3 carrier of the third planetary gearset
PL3 planetary gears of the third planetary gearset
RS4 fourth planetary gearset
HO4 ring gear of the fourth planetary gearset
SO4 sun gear of the fourth planetary gearset
ST4 carrier of the fourth planetary gearset
PL4 planetary gears of the fourth planetary gearset
i transmission ratio
φ progressive ratio

The invention claimed is:

1. A multi-speed automatic gearbox of a planetary design for a motor vehicle, the gearbox comprising:
   an input shaft (AN) and an output shaft (AB);
   first, second, third and fourth planetary gearsets (RS1, RS2, RS3, RS4), the first planetary gearset (RS1), the second planetary gearset (RS2), the third planetary gearset (RS3), and the fourth planetary gearset (RS4) each have a carrier, a sun gear and a ring gear;
   at least first, second, third, fourth, fifth, sixth, seventh and eighth shafts (1, 2, 3, 4, 5, 6, 7, 8);
   first, second, third, fourth and fifth shifting elements (A, B, C, D, E), whose selective engagement determines a variety different gear ratios between the input shaft (AN) and the output shaft (AB) such that eight forward gears and at least one reverse gear can be implemented;
   the carrier (ST4) of the fourth planetary gearset (RS4) is connected to the input shaft (AN) to form the first shaft (1);

the ring gear (HO2) of the second planetary gearset (RS2) and the carrier (ST3) of the third planetary gearset (RS3) and the output shaft (AB) are connected to form the second shaft (2)

the sun gear (SO1) of the first planetary gearset (RS1) is connected to the sun gear (SO4) of the fourth planetary gearset (RS4) to form the third shaft (3);

the ring gear (HO1) of the first planetary gearset (RS1) forms the fourth shaft (4);

the sun gear (SO3) of the third planetary gearset (RS3) forms the fifth shaft (5);

the carrier (ST1) of the first planetary gearset (RS1) is connected to the ring gear (HO3) of the third planetary gearset (RS3) to form the sixth shaft (6);

the sun gear (SO2) of the second planetary gearset (RS2) is connected to the ring gear (HO4) of the fourth planetary gearset (RS4) to form the seventh shaft (7);

the carrier (ST2) of the second planetary gearset (RS2) forms the eight shaft (8);

the first shifting element (A) is arranged within the power flow between the third shaft (3) and a transmission housing (GG);

the second shifting element (B) is arranged within the power flow between the fourth shaft (4) and the transmission housing (GG);

the third shifting element (C) is arranged within the power flow between the first shaft (1) and the fifth shaft (5);

the fourth shifting element (D) is arranged within the power flow between the fifth shaft (5) and the eighth shaft (8); and the fifth shifting element (E) is arranged within the power flow between the fifth shaft (5) and the seventh shaft (7).

2. The multi-speed transmission of claim 1, wherein a first forward gear ratio is produced by engaging the first shifting element (A), the second shifting element (B), and the third shifting element (C);

a second forward gear ratio is produced by engaging the first shifting element (A), the second shifting element (B), and the fifth shifting element (E);

a third forward gear ratio is produced by engaging the second shifting element (B), the third shifting element (C), and the fifth shifting element (E);

a fourth forward gear ratio is produced by engaging the second shifting element (B), the fourth shifting element (D), and the fifth shifting element (E);

a fifth forward gear ratio is produced by engaging the second shifting element (B), the third shifting element (C), and the fourth shifting element (D);

a sixth forward gear ratio is produced by engaging the third shifting element (C), the fourth shifting element (D), and the fifth shifting element (E);

a seventh forward gear ratio is produced by engaging the first shifting element (A), the third shifting element (C), and the fourth shifting element (D);

an eighth forward gear ratio is produced by engaging the first shifting element (A), the fourth shifting element (D), and the fifth shifting element (E), and a reverse gear ratio is produced by engaging the first shifting element (A), the second shifting element (B), and the fourth shifting element (D).

3. The multi-speed transmission of claim 1, wherein the first planetary gearset (RS1), the third planetary gearset (RS3), and the fourth planetary gearset (RS4) are negative planetary gearsets, and the second planetary gearset (RS2) is a positive planetary gearset.

4. The multi-speed transmission of claim 1, wherein the first planetary gearset (RS1), the second planetary gearset (RS2), the third planetary gearset (RS3), and the fourth planetary gearset (RS4) are co-axial and arranged in a sequential order of:

the first planetary gearset (RS1), the fourth planetary gearset (RS4), the second planetary gearset (RS2), and the third planetary gearset (RS3).

5. The multi-speed transmission of claim 1, wherein the input shaft (AN) is one of axially parallel and at an angle with the output shaft (AB), and one of the first planetary gearset (RS1) and the third planetary gearset (RS3) is axially located on a side of the transmission housing (GG) closer to a drive motor, that is functionally connected to the input shaft (AN).

6. The multi-speed transmission of claim 1, wherein the input shaft (AN) is coaxial with the output shaft (AR), and the first planetary gearset (RSI) is located on a side of the transmission housing (GG) facing a drive motor, that is functionally connected to the input shaft (AN).

7. The multi-speed transmission of claim 1, wherein at most one of the first shaft (1), the second shaft (2), the third shaft (3), the fourth shaft (4), the fifth shaft (5), the sixth shaft (6), the seventh shaft (7) and the eighth shaft (8) passes axially centrally through the first planetary gearset (RS1), the third planetary gearset (RS3), and the fourth planetary gearset (RS4).

8. The multi-speed transmission of claim 1, wherein the first shaft (1) passes axially centrally through the first planetary gearset (RS1) and the fourth planetary gearset (RS4), and the fifth shaft (5) passes axially centrally through the second planetary gearset (RS2).

9. The multi-speed transmission claim 1, wherein none of the first shaft (1), the second shaft (2), the third shaft (3), the fourth shaft (4), the fifth shaft (5), the sixth shaft (6), the seventh (7) and the eighth shaft (8) passes axially centrally through at least one of the first planetary gearset (RS1 ) and the fourth planetary gearset (RS4), the fifth shaft (5) and the first shaft (1) pass axially centrally through the second planetary gearset (RS2), the first shaft (1) passes in sections centrally inside the fifth shaft (5), and only the first shaft (1) passes axially centrally through the third planetary gearset (RS3).

10. The multi-speed transmission of claim 1, wherein the third shaft (3) is rotatably supported on a hub which is fixed to the transmission housing (GG).

11. The multi-speed transmission of claim 1, wherein at least one of the first shifting element (A) and the second shifting element (B) is at least partially radially arranged, when viewed spatially, above the first planetary gearset (RS1) and the fourth planetary gearset (RS4).

12. The multi-speed transmission of claim 1, wherein the first shifting element (A) and the second shifting element (B) are axially adjacent, when viewed spatially, and at least one friction element of the second shifting element (B) is closer to the fourth planetary gearset (RS4) than a friction element of the first shifting element (A).

13. The multi-speed transmission of claim 1, wherein one of the first shifting element (A) is at least partially radially arranged, when viewed spatially, above the second shifting element (B) and the second shifting element (B) is at least partially radially arranged, when viewed spatially, above the first shifting element (A).

14. The multi-speed transmission of claim 1, wherein the third shifting element (C) is at least partially axially located, when viewed spatially, between the fourth planetary gearset (RS4) and the second planetary gearset (RS2).

15. The multi-speed transmission of claim 1, wherein the third shifting element (C) is located axially adjacent to the fourth planetary gearset (RS4).

16. The multi-speed transmission of claim 1, wherein the fifth shifting element (E) is at least partially axially located, when viewed spatially, between the fourth planetary gearset (RS4) and the second planetary gearset (RS2).

17. The multi-speed transmission of claim 1, wherein the fifth shifting element (E) is axially located adjacent to the second planetary gearset (RS2).

18. The multi-speed transmission of claim 1, wherein the third shifting element (C) is, when viewed spatially, essentially axially adjacent the fifth shifting element (E), a disc packet of the third shifting element (C) is closer to the fourth planetary gearset (RS4) than a disc packet of the fifth shifting element (E).

19. The multi-speed transmission of claim 1, wherein one of the third shifting element (C) is, when viewed spatially, at least partially radially above the fifth shifting element (E), and the fifth shifting element (E) is, when viewed spatially, at least partially radially above the third shifting element (C) and a disc packet of the fifth shifting element (E) is, when viewed spatially, at least partially radially above a disc packet of the third shifting element (C).

20. The multi-speed transmission of claim 1, wherein the third shifting element (C) and the fifth shifting element (E) have a common disc carrier which is connected to the sun gear (SO3) of the third planetary gearset (RS3).

21. The multi-speed transmission of claim 1, wherein the fourth shifting element (D) is at least partially axially located, when viewed spatially, between the second planetary gearset (RS2) and the third planetary gearset (RS3).

22. The multi-speed transmission of claim 1, wherein the fourth shifting element (D) is axially located adjacent to the second planetary gearset (RS2).

23. The multi-speed transmission of claim 1, wherein the sixth shaft (6), completely overlaps in an axial direction the fourth planetary gearset (RS4), the third shifting element (C), the fifth shifting element (E), the second planetary gearset (RS2), and the fourth shifting element (D).

24. The multi-speed transmission of claim 1, wherein a one-way clutch is located between at least one of the input shaft (AN), the output shaft (AB), the first shaft (1), the second shaft (2), the third shaft (3), the fourth shaft (4), the fifth shaft (5), the sixth shaft (6), the seventh (1) and the eighth shaft (8) and the transmission housing (GG).

25. The multi-speed transmission of claim 1, wherein the input shaft (AN) and the output shaft (AB) are located on opposite sides of the transmission housing (GG).

26. The multi-speed transmission of claim 1, wherein the input shaft (AN) and the output shaft (AB) located on a common side of the transmission housing (GG).

27. The multi-speed transmission of claim 1, wherein at least one of an axle differential and a distributor differential is located on one of the input shaft (AN) and the output shaft (AB).

28. The multi-speed transmission of claim 1, wherein a coupling element is located within the power flow between a drive motor and the input shaft (AN).

29. The multi-speed transmission of claim 28, wherein the coupling element is one of a hydrodynamic converter, a hydraulic clutch, a dry starting clutch, a wet starting clutch, a magnetic particle clutch, and a centrifugal clutch.

30. The multi-speed transmission of claim 1, wherein one of the first shifting element (A), the second shifting element (B), the third shifting element (C), and the fourth shifting element (D) initiates driving the motor vehicle, and the input shaft (AN) is connected in one of a rotationally fixed manner and a rotationally flexible manner to a crankshaft of a drive motor.

31. The multi-speed transmission of claim 30, wherein one of the first shifting element (A) and the second shifting element (B) initiates driving the motor vehicle in a forward direction and a reverse direction.

32. The multi-speed transmission of claim 1, wherein one of a wear free brake, a power take off to drive an additional unit and an electrical machine is located on at least one of the input shaft (AN), the output shaft (AR), the first shaft (1), the second shaft (2), the third shaft (3), the fourth shaft (4), the fifth shaft (5), the sixth shaft (6), the seventh (7) and the eighth shaft (8).

33. The multi-speed transmission of claim 1, wherein the first shifting element (A), the second shifting element (B), the third shifting element (C), and the fourth shifting element (D) are individually one of a non-positive clutch, a non-positive brakes, a disc clutch, a band brake, a conical clutch, a positive clutch, a positive brake, a conical clutch and a conical brake.

* * * * *